United States Patent [19]

Kawai

[11] Patent Number: 4,972,407
[45] Date of Patent: Nov. 20, 1990

[54] TIME-DIVISION SWITCHING CIRCUIT TRANSFORMING DATA FORMATS

[75] Inventor: Yoshio Kawai, Kawasaki, Japan

[73] Assignee: Fujitsu Limited, Kawasaki, Japan

[21] Appl. No.: 416,474

[22] Filed: Oct. 3, 1989

[30] Foreign Application Priority Data

Oct. 3, 1988 [JP] Japan ................. 63-247523

[51] Int. Cl.⁵ .......................................... H04Q 11/04
[52] U.S. Cl. ........................................ 370/68; 370/61; 370/99
[58] Field of Search ................. 370/68, 66, 99, 84, 370/58.1, 61

[56] References Cited

U.S. PATENT DOCUMENTS

| | | | |
|---|---|---|---|
| 4,276,641 | 6/1981 | Nguyen et al. | 370/99 |
| 4,545,052 | 10/1985 | Steierman | 370/68 |
| 4,680,752 | 7/1987 | Takemura et al. | 370/68 |
| 4,686,670 | 8/1987 | Kessels et al. | 370/68 |
| 4,748,618 | 5/1988 | Brown et al. | 370/99 |
| 4,864,562 | 9/1989 | Murakami et al. | 370/99 |

FOREIGN PATENT DOCUMENTS

| | | |
|---|---|---|
| 55-44507 | 2/1977 | Japan . |
| 6031395 | 9/1979 | Japan . |
| 54-140407 | 10/1979 | Japan . |
| 61-140300 | 6/1986 | Japan . |
| 62-142428 | 6/1987 | Japan . |

Primary Examiner—Douglas W. Olms
Assistant Examiner—Alpus H. Hsu
Attorney, Agent, or Firm—Staas & Halsey

[57] ABSTRACT

A time-division switching circuit for exchanging a time slot with another time slot in one cycle of time-division multiplexed data where the above one cycle of data comprises a plurality of time-division multiplexed data respectively having a different data formats. The switching circuit comprises: a data buffer memory a successive address generating circuit for outputting successive writing or reading addresses; an address control memory for holding reading or writing addresses; and an address setting control circuit for setting the addresses of the address control memory. The setting of the above addresses are carried out so that there are simultaneously performed both the exchanges of time slots within each time-division multiplexed data among the above plurality of time-division multiplexed data, and also the exchanges of time slots across different time-division multiplexed data among the above plurality of time-division multiplexed data for transforming a format of data in one of the above different time-division multiplexed data to another format in another of the above different time-division multiplexed data.

4 Claims, 5 Drawing Sheets

TIME-DIVISION SWITCHING CIRCUIT TRANSFORMING DATA FORMATS

BACKGROUND OF THE INVENTION

(1) Field of the Invention

The present invention relates to a time-division switching circuit for exchanging a time slot with another time slot in one cycle of time-division multiplexed data where the above one cycle of data comprises a plurality of time-division multiplexed data each having a different data format.

In time-division multiplexing equipment or time-division switching systems, exchanges of time slots in the data are carried out by a time switch.

Recently, in the field of multi-media transmissiom, wherein time-division multiplexed data including voice data, image data, and data from computer terminals, and the like are transmitted, a technique for realizing an effective transmission is required. In a multi-media transmission, each of the voice data, image data, and data from computer terminals, has an individual data format in the time-division multiplexed data.

In time-division multiplexing equipment and time-division switching systems controlling the above multi-media transmission, exchanges of time slots across different types of data each having a different data format are required in addition to exchanges of time slots within each type of data.

For example, when the transmission rate of a particular type of data is low, that low bit rate data may need to be transformed to another data format corresponding to another type of data, and then be included and transmitted in time slots in a part of a time region which are originally assigned to that above, another type of data, to realize a totally effective multi-media transmission.

(2) Description of the Related Art

FIG. 1 shows an outline of a conventional construction for carrying out exchanges of time slots within each type of data, and exchanges of time slots across the different types of data in conventional time-division multiplexing equipment when two types of data are time-division multiplexed and transmitted.

In FIG. 1, reference numeral 51 denotes a circuit for carrying out exchanges of time slots within the first type of data, 52 denotes a circuit for carrying out exchanges of time slots within the second type of data, and 53 denotes a format transformation circuit between the first and second types of data.

As shown in FIG. 1, in the conventional construction, the above circuit 51 for carrying out exchanges of time slots within the first type of data, the circuit 52 for carrying out exchanges of time slots within the second type of data, and the format transformation circuit 53 for carrying out the format transformation between the first and second types of data, are separately and independently provided.

For example, to exchange a time slot in the first type of data with a time slot in the second type of data in the conventional construction, first, the format of the first type of data is transformed to the format of the second type of data through the above circuit 53, and then, the time slot is exchanged with the time slot in the second type of data through the above circuit 52.

The above circuits 51 and 52 each have a construction of a time switch comprising a data buffer memory and an address control memory, and the construction of the format transformation circuit 53 can be realized by a construction similar to the above time switch, or a hardware circuit constructed for each format transformation.

However, in the conventional construction as mentioned above, the hardware size is large, and accordingly, the control of this hardware is complicated, and the delay time is large due to the two step operation for the format transformation through the transformation circuit 53 and the exchange of time slots in each of the formats through the circuits 51 or 52.

SUMMARY OF THE INVENTION

An object of the present invention is to provide a time-division switching circuit for exchanging a time slot with another time slot in one cycle of time-division multiplexed data where the above one cycle of data comprises a plurality of time-division multiplexed data each having a different data format, with a reduced hardware size, a reduced delay time, and simple control.

According to the present invention, there is provided a time-division switching circuit for exchanging a time slot with another time slot in one cycle of time-division multiplexed data, where the above one cycle of data comprises a plurality of time-division multiplexed data each having a different data format. The time-division switching circuit comprises: a data buffer memory; a successive address generating circuit; an address control memory; and an address setting control circuit. The data buffer memory holds the above one cycle of time-division multiplexed data. The successive address generating circuit generates successive addresses to successively write all the time slots of each cycle of time-division multiplexed data in the above data buffer memory, or to successively read the time slots held in the data buffer memory. The address control memory holds addresses for reading the above data held in the above data buffer memory in such an order that the above exchange of time slots is realized when successive addresses are applied to the address control memory for the reading, or holds addresses for writing all the time slots of each cycle of time-division multiplexed data in the data buffer memory in such an order that the above exchange of time slots is realized when the time slots held in the data buffer memory are successively read out by the successive addresses from the successive address generating circuit. The address setting control circuit sets the above addresses for reading or writing in the above address control memory, where the setting of the above addresses is carried out so that both the exchanges of time slots within each time-division multiplexed data among the above plurality of time-division multiplexed data, and the exchanges of time slots across different time-division multiplexed data among the above plurality of time-division multiplexed data for transforming a format of data in one of the above different time-division multiplexed data to another format in another of the above different time-division multiplexed data, are simultaneously carried out.

DESCRIPTION OF THE PREFERRED EMBODIMENTS

Before describing the preferred embodiment of the present invention, the basic principle of the present invention is explained below.

Figure 1:
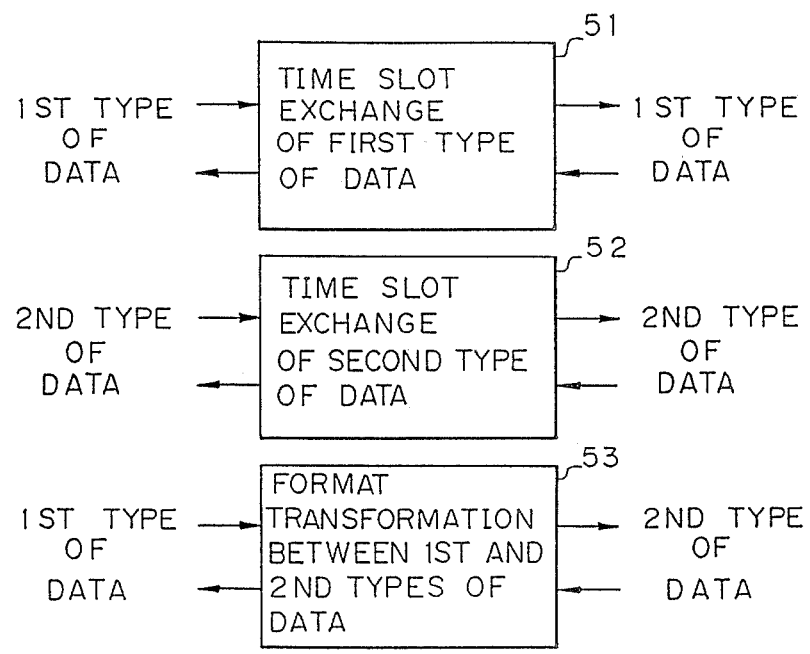
FIG. 1 shows an outline of a conventional construction for carrying out exchanges of time slots within the same type of data, and across the different types of data in a conventional time-division multiplexing equipment when two types of data are time-division multiplexed and transmitted.
Figure 2:
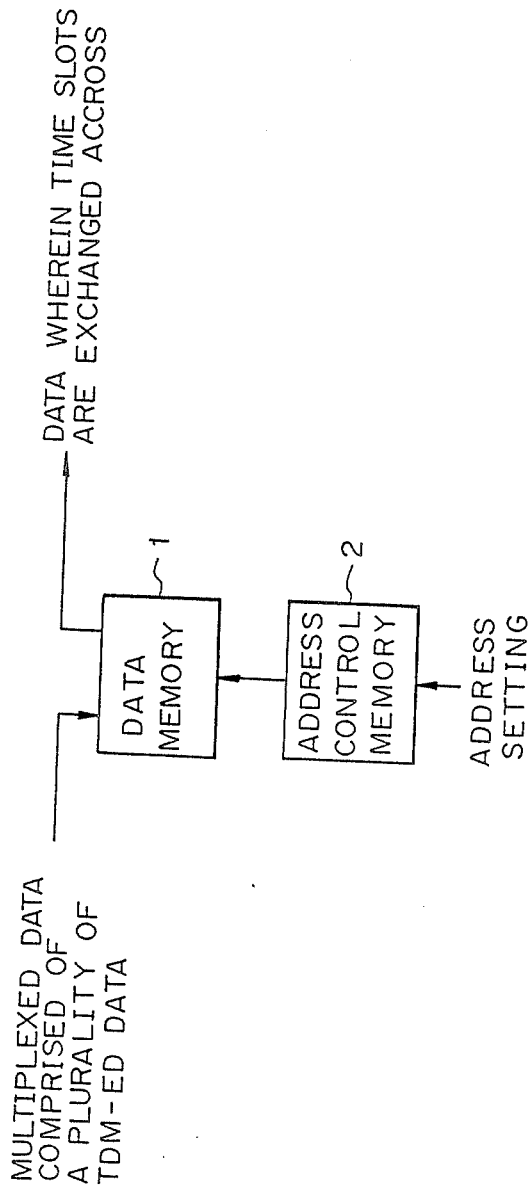
FIG. 2 shows a basic construction of the present invention.

FIG. 2 shows a basic construction of the present invention.

In FIG. 2, reference numeral 1 denotes a data buffer memory, and numeral 2 denotes an address control memory.

The data buffer memory 1 inputs and holds time-division multiplexed data comprised of a plurality of time-division multiplexed data where the plurality of time-division multiplexed data have respective, plural and different data format and the basic bit rate is the same throughout all of the above plurality of time-division multiplexed data.

The address control memory 2 holds addresses for reading the above data, as held in the above data buffer memory 1, in such an order that the above exchange of time slots is realized when successive addresses are applied to the address control memory for the reading, in the case that the time slots of each cycle of time-division multiplexed data are successively written in the above data buffer memory 1, or holds addresses for writing all the time slots of each cycle of time-division multiplexed data in the data buffer memory in such an order that the above exchange of time slots is realized when the time slots held in the data buffer memory 1 are successively read out by the successive addresses. The setting of the above addresses are carried out so that exchanges of time slots within each time-division multiplexed data among the above plurality of time-division multiplexed data, and exchanges of time slots across different time-division multiplexed data among the above plurality of time-division multiplexed data for transforming a format of data in one of the above, different time-division multiplexed data to another format in another of the above different time-division multiplexed data, are simultaneously carried out.

Since both the exchanges of time slots within each of the plurality of time-division multiplexed data, and the transformation of the data format (i.e., the exchanges of time slots across different time-division multiplexed data of the plurality of time-division multiplexed data) are carried out by exchanges of time slots (i.e., by an address transformation between writing addresses and reading addresses of the data buffer memory which holds all the time slots in one cycle of time-division multiplexed data including the plurality of time-division multiplexed data), the aforementioned conventional two step operation comprised of the transformation of the data format, and the exchanges of time slots within each of the plurality of time-division multiplexed data, can be replaced by one address transformation step in the data buffer memory 1. Thus, the hardware size of the time-division switching circuit, and the delay time in the time switching and data transformation, are reduced, and the control of the time-division switching circuit is simplified.

Figure 3:
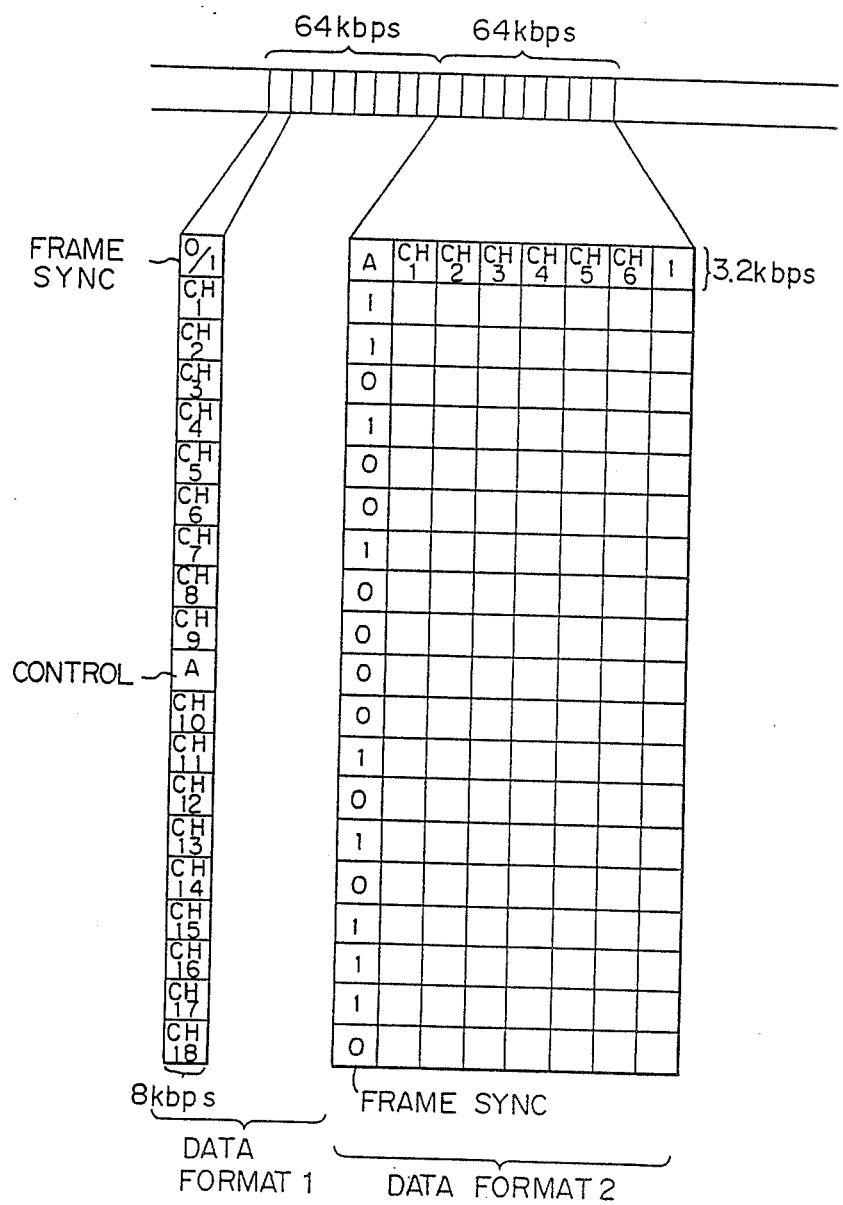
FIG. 3 shows an example of one cycle of data of a time-division multiplexed data comprised of two types of time-division multiplexed data respectively having the data format 1 and the data format 2.

FIG. 3 shows an example of one cycle of data of a time-division multiplexed data comprised of two types of time-division multiplexed data, respectively having the data format 1 and the data format 2. One cycle of the time-division multiplexed data shown in FIG. 3 contains 128 kbps, and is composed of two time regions each containing 64 kbps. The first time region contains eight first type of multi-frames each having the above data format 1, and the second time region contains a second type of multi-frame having the above data format 2.

The data format 1 is usually used for transmitting voice data with signaling data, and contains eight multi-frames of a first type. The first type of multi-frame (the data format 1) is comprised of one bit $\times 20$, wherein the first bit is a frame synchronization bit (FRAME SYNC), the bit denoted by A is a control bit, and the remaining eighteen bits, respectively denoted by CH1, CH2, ... CH18, are each a data bit.

The data format 2 is usually used for transmitting data output from terminal equipment of a computer or the like, and this format is in accordance with the CCITT recommendation X.50. The second type of multi-frame (the data format 2) is comprised of twenty frames, wherein each frame is comprised of eight bits, having a control bit (denoted by A) or a frame synchronization bit in the first of the eight bits, six data bits, respectively denoted by CH1, CH2, ... CH6, and a parity bit ("1") in the last of the eight bits.

In each data format, the common bit rate is 0.4 kbps, and therefore, one multi-frame in the data format 1 occupies $0.4 \times 20 = 8$ kbps, and one multi-frame in the data format 2 occupies $0.4 \times 8 \times 20 = 64$ kbps.

Typically, 64 kbps of voice data having 8 bits per sample is generated by PCM coding at a sampling rate of 8 kHz. Then, this PCM data is often compressed by the ADPCM or the like, to 32 kbps or 16 kbps. Further, signaling data accompanies the voice data for controlling and monitoring the transmission of the voice data, and generally, the signaling data occupies a small bit rate.

On the other hand, generally, multi-frames of the data format 2 are not filled with data. Therefore, if there is a vacancy which can contain the above-mentioned signaling data in the multi-frame of the data format 2, by transforming the signaling data, which is originally transmitted in the data format 1, into the data format 2, and transmitting the signaling data in the second region of the data as shown in FIG. 3, the 64 kbps of the first time region can be used by the voice data only. Thus, the first region can contain one transmission circuit transmitting the 64 bps PCM data, two transmission circuits each transmitting the 32 bps ADPCM data, or four transmission circuits each transmitting the 16 bps ADPCM data. Namely, the transmission efficiency is improved by the above data format transformation of the signaling data.

Figure 4:
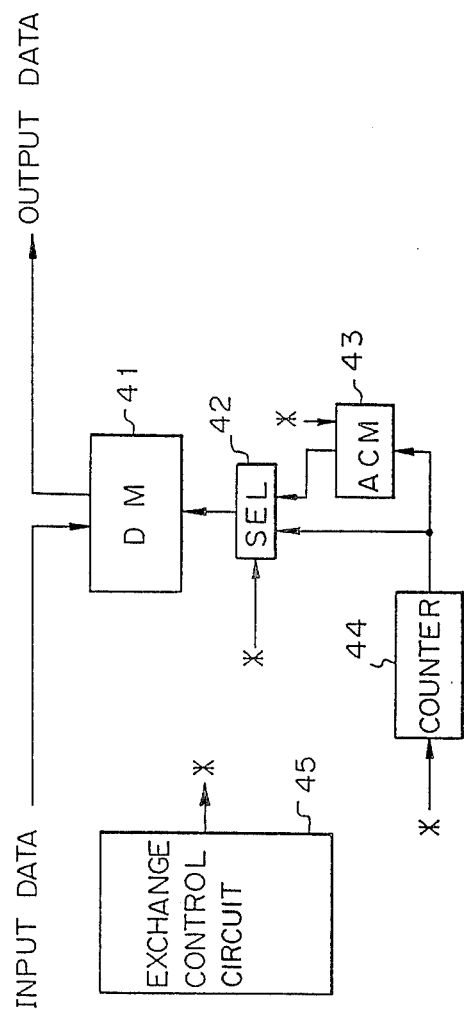
FIG. 4 shows the construction of the time-division switching circuit according to the present invention.

FIG. 4 shows the construction of the time-division switching circuit according to the present invention.

In FIG. 4, reference numeral 41 denotes a data buffer memory ("DM"), 42 denotes a selector ("SEL"), 43 denotes an address control memory ("ACM"), 44 denotes a counter, and 45 denotes an exchange control circuit.

All time slots in one cycle of input data, which is time-division multiplexed data, for example, having a data construction as shown in FIG. 3, are successively written in the data buffer memory 41 according to successive addresses supplied from the counter 44. The total number of bits held at one time in the data buffer memory 41, amounts to 320 bits (eight cycles of the 20 bits of the data format 1, and 8×20 bits of the data the data format 2 in the example of FIG. 3).

On the other hand, the exchange control circuit 45, in advance, sets the contents of the address control memory 43 so that required exchanges of time slots are achieved when addresses of the address control memory 43 are successively supplied from the successive outputs of the counter 44, where the exchanges simultaneously include the above-mentioned data format transformation across the different types of the time-division multiplexed data, and the exchanges of time slots within each type of time-division multiplexed data.

In practice, the time-division switching circuit in the embodiment of the present invention has a double buffer construction, i.e., has the construction of FIG. 4 doubly, and uses one side of the double construction for writing into the data buffer memory 41 and the address control memory 43, and the other side for reading out the data buffer memory 41, alternatively for each cycle of the input.

The exchange control circuit 45 is implemented by a conventional stored program control system comprised of a computer system wherein a control program for the time slot exchange operations of the input data is incorporated, except that synthesized transformation addresses calculated by a multiple of the address transformations for the exchange of time slots within each time-division multiplexed data, and the address transformation for the exchange of time slots across each time-division multiplexed data for a data format transformation, are afforded therein, and are then written in the address control memory 43.

Figure 5:
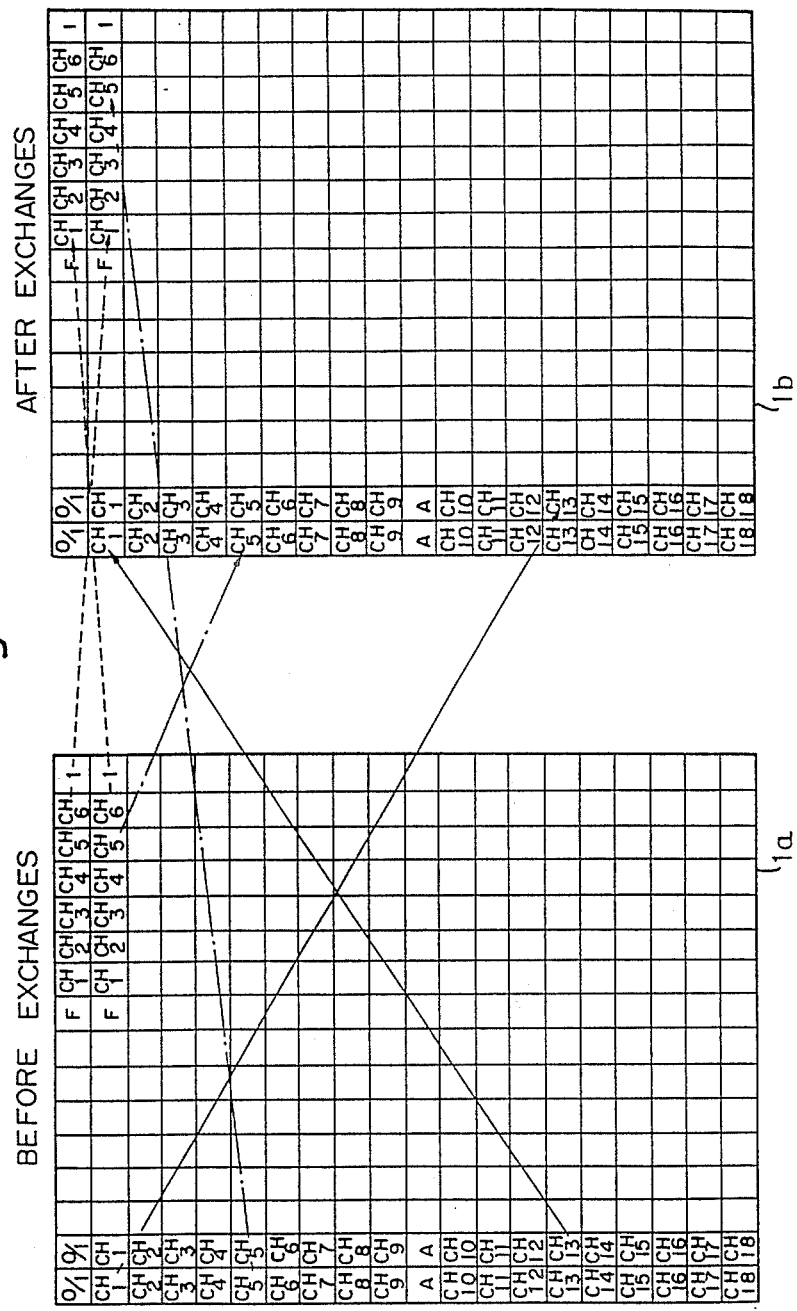
FIG. 5 show an example of the exchanges of time slots in one cycle of data according to the present invention.

An example of the exchanges of time slots in one cycle of data according to the present invention is shown in FIG. 5.

The arrows in solid lines each show a time slot exchange within the first time region as denoted in FIG. 3, the arrows in dashed lines each show a time slot exchange within the second time region as denoted in FIG. 3, and the arrows in dot-dash lines each show a time slot exchange for data transformation across the first and second time regions as denoted in FIG. 3. These exchanges are achieved by setting the address data in the address control memory 43 so that, when the input data is written in the order shown in the left side of FIG. 5, the corresponding output data from the data buffer memory 41 is read out in the order shown in the right side of FIG. 5.

I claim:

1. A time-division switching circuit for exchanging a time slot with another time slot in one cycle of time-division multiplexed data, where said one cycle of data comprises a plurality of time-division multiplexed data respectively having different data formats, comprising:
    a first data buffer memory for holding one cycle, as aforesaid, of time-division multiplexed data;
    a successive address generating circuit for generating successive addresses to successively write all the time slots of each cycle of time-division multiplexed data into said first data buffer memory;
    an address control memory for holding addresses for reading the time slots held in said first data buffer memory, said addresses for reading being held in said address control memory in such an order so as to effect said exchange of time slots when successive addresses are applied to said address control memory for deriving therefrom the aforesaid addresses for reading as held therein; and
    an address setting control circuit for setting said addresses for reading into said address control memory for being held thereby, said setting of said addresses for reading being carried out so as to simultaneously perform exchanges of time slots within each time-division multiplexed data among said plurality of time-division multiplexed data, and exchanges of time slots across different time-division multiplexed data among said plurality of time-division multiplexed data for transforming a format of data in one of said different time-division multiplexed data to another format in another of said different time-division multiplexed data.

2. A time-division switching circuit according to claim 1, further comprising:
    a second data buffer memory, in addition to said first data buffer memory, each for holding one cycle of time-division multiplexed data, each cycle of said time-division multiplexed data including said plurality of time-division multiplexed data; and
    means for writing successive time-division multiplexed data of said plurality thereof into corresponding, alternately selected ones of said first and second data buffer memories, and, while data is written into a selected one of said first and second data buffer memories in accordance with the addresses generated by said successive address generating circuit, for reading out data held in the other of said first and second data buffer memories in accordance with the addresses output from said address control memory.

3. A time-division switching circuit for exchanging a time slot with another time slot in one cycle of time-division multiplexed data, where said one cycle of data comprises a plurality of time-division multiplexed data respectively having different data formats, comprising:
    a first data buffer memory for holding one cycle, as aforesaid, of time-division multiplexed data;
    a successive address generating circuit for generating successive addresses to successively read the time slots held in said data buffer memory;
    an address control memory for holding addresses for writing all the time slots of each cycle of time-division multiplexed data into said first data buffer memory, said addresses for writing being held in said address control memory in such an order so as to effect said exchange of time slots when the time slots held in said data buffer memory are successively read out; and
    an address setting control circuit for setting said addresses for writing into said address control memory for being held thereby, said setting of said addresses are for writing being carried out so as to simultaneously perform exchanges of time slots within each time-division multiplexed data among said plurality of time-division multiplexed data, and exchanges of time slots across different time-division multiplexed data among said plurality of time-division multiplexed data for transforming a format of data in one of said different time-division multiplexed data to another format in another of said different time-division multiplexed data.

4. A time-division switching circuit according to claim 3, further comprising:

a second data buffer memory, in addition to said first data buffer memory, each for holding one cycle of time-division multiplexed data, each cycle of said time-division multiplexed data including said plurality of time-division multiplexed data; and means for writing successive time-division multiplexed data of said plurality thereof into corresponding, alternately selected ones of said first and second data buffer memories, and, while data is written into a selected one of said first and second data buffer memories in accordance with the addresses output from said address control memory, for reading out data held in the other of said first and second data buffer memories in accordance with the addresses generated by said successive address generating circuit.

* * * * *

UNITED STATES PATENT AND TRADEMARK OFFICE
CERTIFICATE OF CORRECTION

PATENT NO. : 4,972,407
DATED : Nov. 20, 1990
INVENTOR(S) : KAWAI

It is certified that error appears in the above-identified patent and that said Letters Patent is hereby corrected as shown below:

Title Page [56] FOREIGN PATENT DOCUMENTS, change "6031395" to --60-31395--.

Front Page [57] ABSTRACT, line 5, delete "a";
        line 6, delete ":" and after "memory" insert --;--.

Col. 3,   line 10, change "show" to --shows--;
          line 28, change "format" to --formats--;
          line 66, delete ",".

Col. 4,   line 2, delete ",";
          line 3, delete ",";
          line 58, change "bps" to --kbps--;
          line 59, change "bps" to --kbps--;
          line 60, change "bps" to --kbps--.

Col. 6,   line 63, delete "are".

Signed and Sealed this

Eleventh Day of August, 1992

*Attest:*

DOUGLAS B. COMER

*Attesting Officer*     *Acting Commissioner of Patents and Trademarks*